United States Patent Office 2,806,491
Patented Sept. 17, 1957

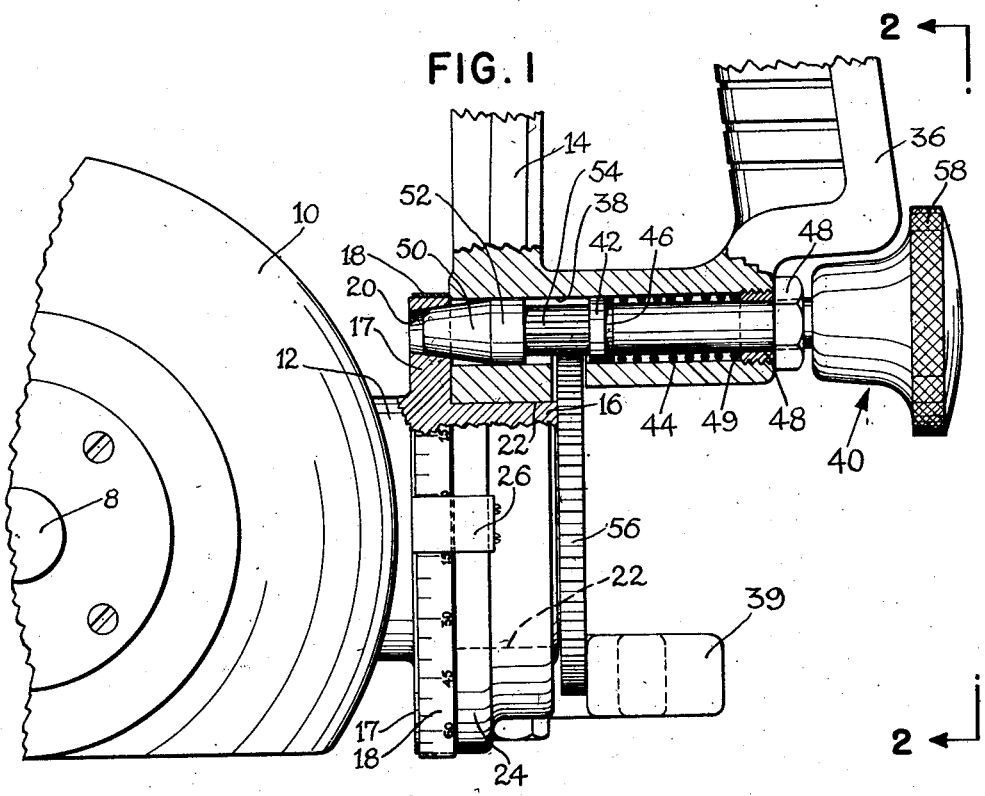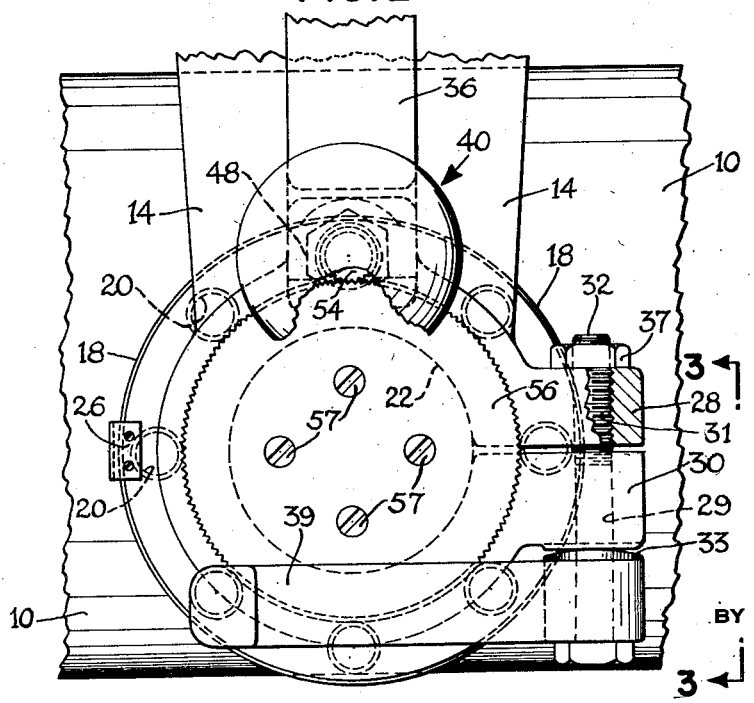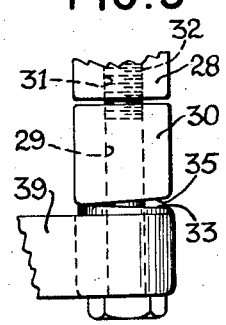

2,806,491

COMBINATION ADJUSTMENT AND LOCKING DEVICE FOR A JOINTED SUPPORTING ARM FOR A POWER TOOL

Robert C. Kaley, Landisville, Pa., assignor to De Walt Inc., a corporation of Pennsylvania Application November 25, 1955, Serial No. 548,858

8 Claims. (Cl. 143—36)

This invention relates to adjustment and locking devices. More particularly, it relates to an adjustment means for accurately selecting and locking the angular position of a member journaled in a bearing.

It is an object of the invention to accurately set the angular adjustment of supporting members of a power tool.

As shown in Snyder Patent No. 2,722,952, dated November 8, 1955, one type of power tool includes a supporting vertical standard, a horizontal radial arm swingably mounted on a journal of the standard and finally a motor supporting yoke adjustably supporting the journals of motor trunnions. Each joint or connection is adapted for angular adjustment.

It is an object of this invention to provide a combined means to lock these adjustments at predetermined commonly used angular positions and make fine angular adjustments to less commonly used positions.

It is an object of this invention to provide a unitary plunger having an adjustment gear and a locking portion for accomplishing these dual purposes.

As hereinafter illustrated, the invention is shown in conjunction with the motor trunnion as it pivots in a bearing of the motor yoke but it is equally applicable to other similar adjustments in such machines.

The novel features which I believe to be characteristic of my invention are set forth with particularity in the appended claims. My invention itself, however, both as to its organization and method of operation may be understood by the apparatus embodying my invention shown in the accompanying drawings in which:

Fig. 1 shows a side elevation partly in section of the adjustable connection of yoke and motor trunnion;

Fig. 2 shows an end elevation of the same taken on line 2—2 of Fig. 1; and

Fig. 3 is a partial detailed end elevation of the bearing lugs in conjunction with the clamping lever, taken on line 3—3 of Fig. 2.

The saw motor housing 10 is provided with trunnion 12 rotatively supported in a movable yoke arm 14. In this type of machine the motor shaft 8 carries a rotary cutting tool such as a saw, drill, shaper or router. The trunnion 12 has a journal or bearing flange 16 which is provided with a vertical portion 17. A scale 18 is mounted on the periphery of vertical portion 17. This scale 18 is employed for indicating the angular adjustment of the motor from its normal horizontal position. The vertical portion 17 of flange 16 is further provided with tapered horizontal holes 20 located as shown in Fig. 2 at 45 degree intervals. Trunnion 12 is rotatably mounted in the bore 22 of split bearing 24 of yoke 14. A degree indicator 26 is secured to the split bearing 24 and extends over scale 18 to indicate degrees of rotation of motor trunnion 12 in bore 22.

Split bearing 24 has integral lugs 28 and 30 (Fig. 2). Lug 30 has a bore 29 and lug 28 has a threaded bore 31. A clamp bolt 32 is threaded in bore 31 and passes through bore 29. The lower end of bolt 32 rotatably supports a lever arm 39 having a cam surface 33 on its hub portion which faces the cam bottom surface 35 of lug 30 of the split bearing 24. When the arm 39 is swung to the position shown in Fig. 2, the high points of cam surfaces 33 and 35 contact each other to draw lugs 28 and 30 toward each other and clamp bearing 24 about bearing flange 16 to hold trunnion 12 against rotation. Since bolt 32 is threaded into lug 28 and provided with a locknut 37 the effective pressure exerted by cam surfaces 33 and 35 may be adjusted to any desirable degree.

The yoke 14 has an integral handle 36 for moving the yoke. Handle 36 has a bore 38 on which plunger pin 40 is mounted for longitudinal reciprocation. Plunger pin 40 has an annular flange 42 slidably engaging the bore 38. A compression spring 44 at its one end bears against a shoulder 46 of annular flange 42. A bushing 48 is threaded into the bore 38 to guide plunger pin 40 and to provide a face 49 against which the other end of spring 44 abuts. As may be seen in Fig. 1, spring 44 urges plunger pin 40 to the left. Plunger pin 40 has a tapered tip 50 which engages in any of the holes 20 of bearing flange 16. Tip 50 has a level portion 52 which like the annular flange 42 slides in the bore 38 and provides stability of the plunger pin 40. There is also formed on the plunger pin an elongated gear 54 which engages with a gear 56 secured to trunnion 12 by screws 57. Gear 54 is elongated so that it is always in engagement with the gear 56 during longitudinal movement of plunger pin 40.

In operation, motor 10 is rotated on the trunnion 12 when the lever 39 is in the released position and the plunger pin is pulled out of the holes 20 against the force of the spring 44. When it is desired to angularly position the motor 10 at more commonly used angles, the plunger pin may be released and the tip 50 urged by the spring 46 into a hole 20 corresponding to the desired angular position. When, however, it is desired to position the motor at an intermediate angle, the plunger pin 40 is pulled out of the hole 20 and the motor rotated to approximately the desired angle, in which event the plunger pin, not being in register with the hole 20, slides on the side surface of the vertical portion 17 intermediate the holes 20. Accurate micro adjustment to the desired angle may then be obtained by rotating plunger pin 40 by means of the knurled knob 58. The relative size difference between the gears 54 and 56 provides a fine adjustment. The finely adjusted intermediate angular position may then be retained by moving lever 34 to the clamping position.

The plunger pin 40 thus has a dual purpose of locking the journal or bearing flange 16 at the more commonly used angles and of micro adjustment of the journal to the intermediate angles.

I claim:

1. In combination with a motor suitable for driving a rotary cutting tool, a trunnion on said motor supported for adjustment rotation in a bearing, a free pin mounted adjacent said bearing, said pin being mounted for longitudinal and rotative adjustment, a concentric flange on said trunnion, said flange having holes about its edge at predetermined angles to receive a portion of said pin, resilient means to urge said pin into said holes when said holes are in register with said pin, a concentric gear on said trunnion, a concentric gear on said pin in mesh with said first-named gear in any adjusted position of said pin, and other releasable securing means to secure said trunnion against rotation whereby said pin may secure said trunnion at any of said predetermined angles and rotation of said pin may accurately adjust said trunnion to any intermediate angle and said releasable securing means may secure said trunnion at said intermediate angle.

2. In combination with a motor suitable for driving a rotary cutting tool, a trunnion on said motor supported for adjustment rotation in a bearing, a free pin mounted adjacent said bearing, said pin being mounted for longitudinal and rotative adjustment, a concentric flange on said trunnion, said flange having holes about its edge at predetermined angles to receive a portion of said pin, resilient means to urge said pin into said holes when said holes are in register with said pin, a concentric gear on said trunnion, a concentric gear on said pin in mesh with said first-named gear in any adjusted position of said pin, and other releasable friction means to secure said trunnion against rotation whereby said pin may secure said trunnion at any of said predetermined angles and rotation of said pin may accurately adjust said trunnion to any intermediate angle and said releasable friction means may secure said trunnion at said intermediate angle.

3. In combination with a motor suitable for driving a rotary cutting tool, a trunnion on said motor supported for adjustment rotation in a bearing, a free pin mounted adjacent said bearing, said pin being mounted for longitudinal and rotative adjustment, a concentric flange on said trunnion, said flange having tapered holes about its edge at predetermined angles to receive a portion of said pin, resilient means to urge said pin into said holes when said holes are in register with said pin, a concentric gear on said trunnion, a concentric gear on said pin in mesh with said first-named gear in any adjusted position of said pin, and other releasable means to secure said trunnion against rotation whereby said pin may secure said trunnion at any of said predetermined angles and rotation of said pin may accurately adjust said trunnion to any intermediate angle and said other releasable means may secure said trunnion at said intermediate angle.

4. In combination with a motor suitable for driving a rotary cutting tool, a trunnion on said motor supported for adjustment rotation in a bearing, a free pin mounted adjacent said bearing, said pin being mounted for longitudinal and rotative adjustment, a concentric flange on said trunnion, said flange having tapered holes about its edge at predetermined angles to receive a portion of said pin, resilient means to urge said pin into said holes when said holes are in register with said pin, a concentric gear on said trunnion, a concentric gear on said pin in mesh with said first-named gear in any adjusted position of said pin, and other releasable friction means to secure said trunnion against rotation whereby said pin may secure said trunnion at any of said predetermined angles and rotation of said pin may accurately adjust said trunnion to any intermediate angle and said releasable friction means may secure said trunnion at said intermediate angle.

5. An adjustable bearing connection comprising a journal rotatably mounted in a bearing, said bearing having engaging means to secure said journal from rotation therein, a concentric annular flange secured to said journal, said flange having holes formed at predetermined angular positions about said flange, the axis of said holes being parallel to the axis of said journal, a pin mounted parallel the axis of said journal and movable from a hole engaging position to a non-hole engaging position, a concentric gear on said journal, a concentric elongated gear on said pin engaging said first-named gear in any adjusted position of said pin, and said pin being rotatable so said pin gear may drive said journal gear to rotate said journal whereby said pin may secure said journal at predetermined angular positions in said bearing established by said holes of said annular flange and said pin may be rotated when in non-hole engaging position to selectively position said trunnion at intermediate angles, said means then securing said journal against rotation.

6. In a device for supporting a motor having a trunnion, a split bearing rotatably supporting said trunnion, securing means on said split bearing to coact therewith to close said bearing tightly on said trunnion to prevent rotation thereof in said bearing, holes formed in said trunnion at predetermined angular positions thereabout, a pin rotatably and slidably mounted on said bearing, said pin being movable to hole engaging position to secure said trunnion at a predetermined angular position in said bearing, a gear formed on said pin, a gear formed on said trunnion, said gear on said pin being engageable with said gear on said trunnion when said pin is in non-hole engaging position so that rotation of said pin may rotate said trunnion whereby said trunnion may be rotated to selected intermediate angular position and said securing means may secure said trunnion at said selected angular positions.

7. An adjustable bearing connection comprising a journal rotatably mounted in a bearing, engaging means movable to secure said journal from rotation therein, an annular flange secured to said journal, said flange having holes formed at predetermined angular positions about said flange, a pin mounted adjacent said flange and movable into hole engaging position to secure said flange on said bearing against rotation, said pin having a gear formed thereon, a gear on said journal in engagement with said gear on said pin so that rotation of said pin may rotate said journal, said gear being in engagement when said pin is in non-hole engaging position, whereby said pin may secure said journal in predetermined angular positions corresponding to the location of said holes and said pin may be rotated when in non-hole engaging position to selectively position said journal at selected intermediate angular positions, said engaging means then securing said journal against rotation.

8. An adjustable bearing connection comprising a first member rotatably mounted in a second member, engaging means movable to secure said members against relative motion, holes formed in one of said members at predetermined angular positions, a pin having a gear formed thereon slidably mounted in the other of said members and movable to hole engaging position to secure said members at predetermined angular positions relative to each other, a gear formed on the said one of said members and in engagement with said gear on said pin when said pin is in non-hole engaging position whereby said pin may secure said members at predetermined angular positions established by said holes and said pin may be rotated when in non-hole engaging position to selectively position said members relative to each other in selected intermediate angular position, said engaging means then securing said members against relative rotation from said selected intermediate angular position.

References Cited in the file of this patent
UNITED STATES PATENTS

| | | |
|---|---|---|
| 1,299,765 | Norton et al. | Apr. 8, 1919 |
| 1,599,498 | Spiro | Sept. 14, 1926 |
| 1,841,939 | Koning et al. | Jan. 12, 1932 |
| 2,289,259 | Gardner et al. | July 7, 1942 |
| 2,722,952 | Snyder | Nov. 8, 1955 |